US012086765B2

(12) United States Patent
Isgar

(10) Patent No.: US 12,086,765 B2
(45) Date of Patent: Sep. 10, 2024

(54) CREATIVE WORK CONTRIBUTION SYSTEM

(71) Applicant: Charles Isgar, Scottsdale, AZ (US)

(72) Inventor: Charles Isgar, Scottsdale, AZ (US)

(*) Notice: Subject to any disclaimer, the term of this patent is extended or adjusted under 35 U.S.C. 154(b) by 60 days.

(21) Appl. No.: 17/933,542

(22) Filed: Sep. 20, 2022

(65) Prior Publication Data
US 2023/0011962 A1  Jan. 12, 2023

Related U.S. Application Data

(63) Continuation of application No. 17/192,064, filed on Mar. 4, 2021, now abandoned.

(60) Provisional application No. 62/985,297, filed on Mar. 4, 2020, provisional application No. 62/985,295, filed on Mar. 4, 2020.

(51) Int. Cl.
| | |
|---|---|
| *G06Q 10/10* | (2023.01) |
| *G06F 16/9535* | (2019.01) |
| *G06Q 10/06* | (2023.01) |
| *G06Q 10/101* | (2023.01) |
| *G06Q 30/04* | (2012.01) |
| *G06Q 30/06* | (2023.01) |
| *H04L 65/401* | (2022.01) |

(Continued)

(52) U.S. Cl.
CPC ....... *G06Q 10/101* (2013.01); *G06F 16/9535* (2019.01); *G06Q 10/103* (2013.01); *H04L 65/4015* (2013.01); *H04L 65/4053* (2013.01); *H04L 67/306* (2013.01)

(58) Field of Classification Search
CPC ................ G06Q 10/101; G06Q 10/103; G06F 16/9535; H04L 65/4015; H04L 65/4053; H04L 67/306; H04L 12/1827

USPC .......................................... 705/1.1–912, 300
See application file for complete search history.

(56) References Cited

U.S. PATENT DOCUMENTS

| | | |
|---|---|---|
| 7,082,430 B1 | 7/2006 | Danielsen et al. |
| 7,571,212 B2 | 8/2009 | Reynolds et al. |
| | (Continued) | |

OTHER PUBLICATIONS

Tucker, J. D., Day, S., Tang, W., & Bayus, B. (2019). Crowdsourcing in medical research: Concepts and applications. PeerJ, , n/a. doi:http://dx.doi.org/10.7717/peerj.6762, Apr. 12, 2019 (Year: 2019).*

*Primary Examiner* — Jonathan P Ouellette
(74) *Attorney, Agent, or Firm* — Schmeiser, Olsen & Watts LLP

(57) ABSTRACT

Described is a creative work contribution system. The system includes a server, a creator computing device and a plurality of contributor computing devices. The creator computing device and the plurality of contributor computing devices may be coupled to the server. The server may be programmed to receive and store a creative work request from the creator computing device; automatically process the creative work request and send the creative work request to the plurality of contributor computing devices for display and for entering contributions to the creative work request; receive and store the contributions entered by the plurality of contributor computing devices; and automatically deliver the received contributions entered by the plurality of contributor computing devices for display on the creator computing device. The system allows for crowd sourcing of creative input into specific types of creative works to help a creator overcome mental obstacles.

14 Claims, 19 Drawing Sheets

(51) Int. Cl.
    *H04L 65/4053*     (2022.01)
    *H04L 67/306*     (2022.01)

(56) References Cited

U.S. PATENT DOCUMENTS

| | | |
|---|---|---|
| 8,073,811 B2 | 12/2011 | Strathearn et al. |
| 8,843,831 B2 | 9/2014 | Brookhart |
| 9,983,759 B1 | 5/2018 | Dhawan et al. |
| 2005/0240859 A1 | 10/2005 | Bodin et al. |
| 2009/0271481 A1 | 10/2009 | Becker |
| 2011/0289150 A1 | 11/2011 | Westaway et al. |
| 2012/0047026 A1 | 2/2012 | Ranauro et al. |
| 2013/0238705 A1 | 9/2013 | Weller et al. |
| 2013/0254298 A1* | 9/2013 | Lorphelin ............... H04L 67/10 709/205 |
| 2014/0040779 A1 | 2/2014 | Bortree |
| 2015/0339020 A1* | 11/2015 | D'Amore .............. G06F 3/0484 715/753 |
| 2016/0112476 A1 | 4/2016 | Gudipaty et al. |
| 2016/0147864 A1 | 5/2016 | Kane |
| 2016/0266740 A1 | 9/2016 | Glasgow |
| 2016/0328453 A1 | 11/2016 | Galuten |
| 2017/0195411 A1 | 7/2017 | Mabey et al. |
| 2020/0293995 A1 | 9/2020 | El Shaw et al. |

\* cited by examiner

CONTRIBUTION CAN BE DONE FROM ANYWHERE

CREATIVE WORK CONTRIBUTION SYSTEM

CROSS REFERENCE TO RELATED APPLICATION

This application is a continuation of U.S. patent application entitled "CREATIVE WORK CONTRIBUTION SYSTEM," Ser. No. 17/192,064, filed on Mar. 4, 2021, which claims priority to U.S. Provisional Patent Applications entitled "CREATIVE WORK CONTRIBUTION SYSTEM," Ser. No. 62/985,295, filed Mar. 4, 2020, and "CREATIVE WORK COLLABORATION SYSTEM," Ser. No. 62/985,297, filed Mar. 4, 2020, the disclosures of which are hereby incorporated entirely herein by reference.

BACKGROUND OF THE INVENTION

Technical Field

This invention generally relates to a system for contributing to a creative work, and more specifically to a creative work contribution system for crowd sourcing input on a creative work from others at a request from the creator.

State of the Art

Many creative individuals often engage a mental obstacle when developing a creative work. Writers often refer to it as "writer's block". This can stymie a creator's ability to complete a work. Conventionally, there is no solution for overcoming this mental obstacle in order to complete the work. Typically, it just takes time. There does not exist a system that would allow the creator an opportunity to engage anonymous and known people at any given time to contribute to the creative work to overcome this mental obstacle.

Accordingly, what is needed is a creative work contribution system for crowd sourcing input on a creative work from others at a request from the creator in order to overcome a mental obstacle in the creative process.

SUMMARY OF THE INVENTION

An embodiment includes a creative work contribution system comprising: a server having a memory storing user information; and a creator computing device of a creator and a plurality of contributor computing devices of contributors coupled to the server, wherein the server is programmed to: receive and store a creative work request from the creator computing device; automatically process the creative work request and send the creative work request to the plurality of contributor computing devices for display and for entering contributions to the creative work request; receive and store the contributions entered by the plurality of contributor computing devices; and automatically deliver the received contributions entered by the plurality of contributor computing devices for display on the creator computing device. The creator computing device may be a mobile computing device. A mobile application may operate on the creator computing device. The plurality of contributor computing devices may be mobile computing devices. A mobile application may operate on the plurality of contributor computing devices. The mobile application operating on the plurality of contributor computing devices may provide a contributor user interface for the contributors to view a creative work and enter a suggestion. The contributors may browse the creative work requests that are open. The user information may comprise demographic information of the creator and demographic information of the contributors. The user information may comprise profile information of the creator and profile information of the contributors. The user information may comprise profile information of the creator and profile information of the contributors. The profile information may comprise skill level, rating level and/or activity level of the creator and the contributors. The creator and each of the contributors may be located at different locations. The creative work request may comprise an option for voting or polling by the contributor computing devices. The creative work request may comprise a time limit for the creative work request to be open for the contributions. The server may aggregate the stored contributions for decisions to be made when the creative work request is closed and no longer accepting contributions.

The foregoing and other features and advantages of the invention will be apparent to those of ordinary skill in the art from the following more particular description of the invention and the accompanying drawings.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DETAILED DESCRIPTION OF EMBODIMENTS OF THE INVENTION

Embodiments of the present invention relate to a creative work contribution system for crowd sourcing input on a creative work from others at a request from the creator in order to overcome a mental obstacle in the creative process. The system may include the use of a mobile application operating on a creator computing device and contributor computing device that may be a mobile computing device like a smartphone, a tablet, a wearable, and the like; and/or the system may operate on any type of computing device as a downloadable application or even as a web application.

Figure 1:
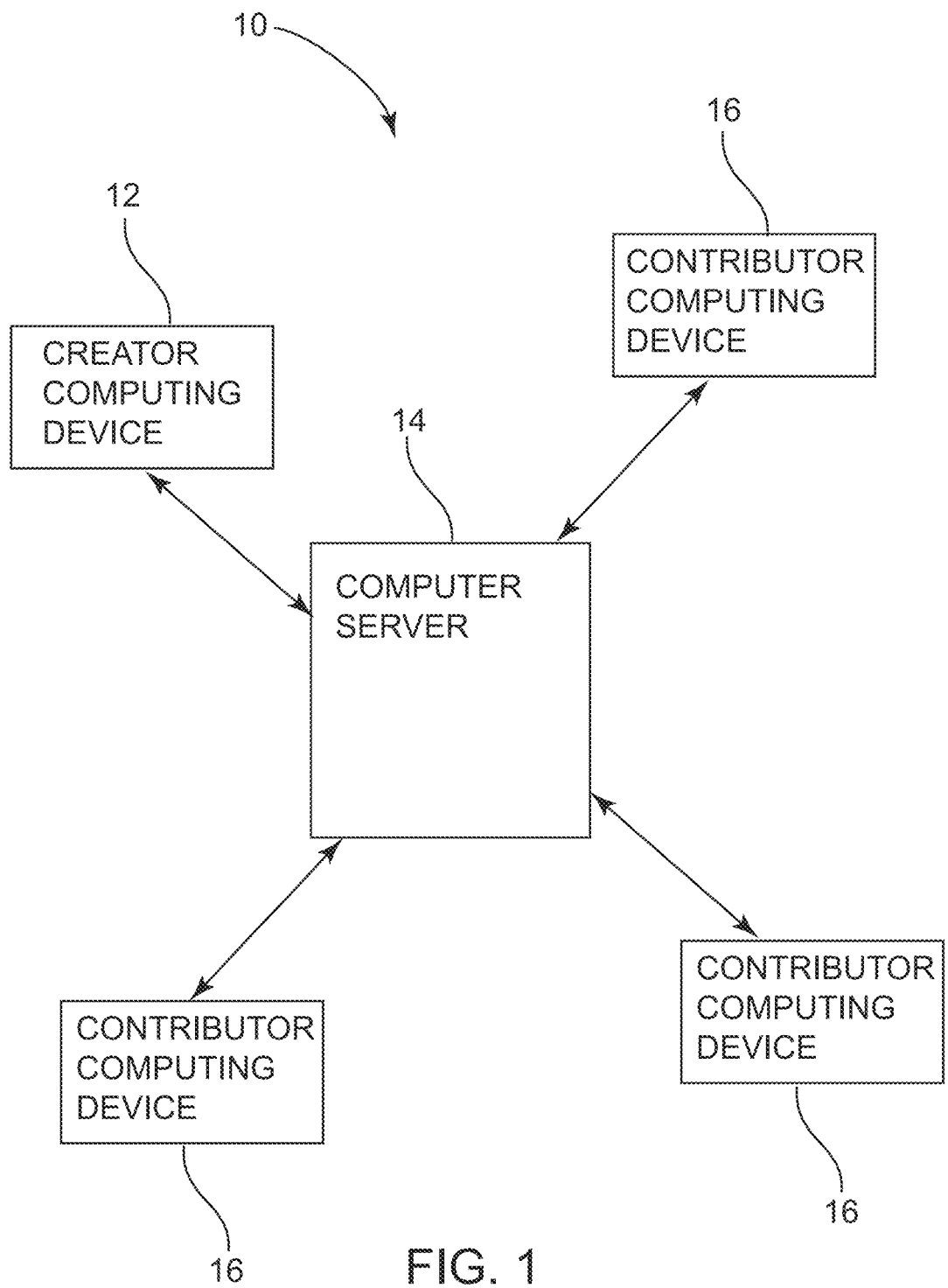
FIG. 1 a diagrammatic view of a creative work contribution system according to an embodiment.
Figure 2:
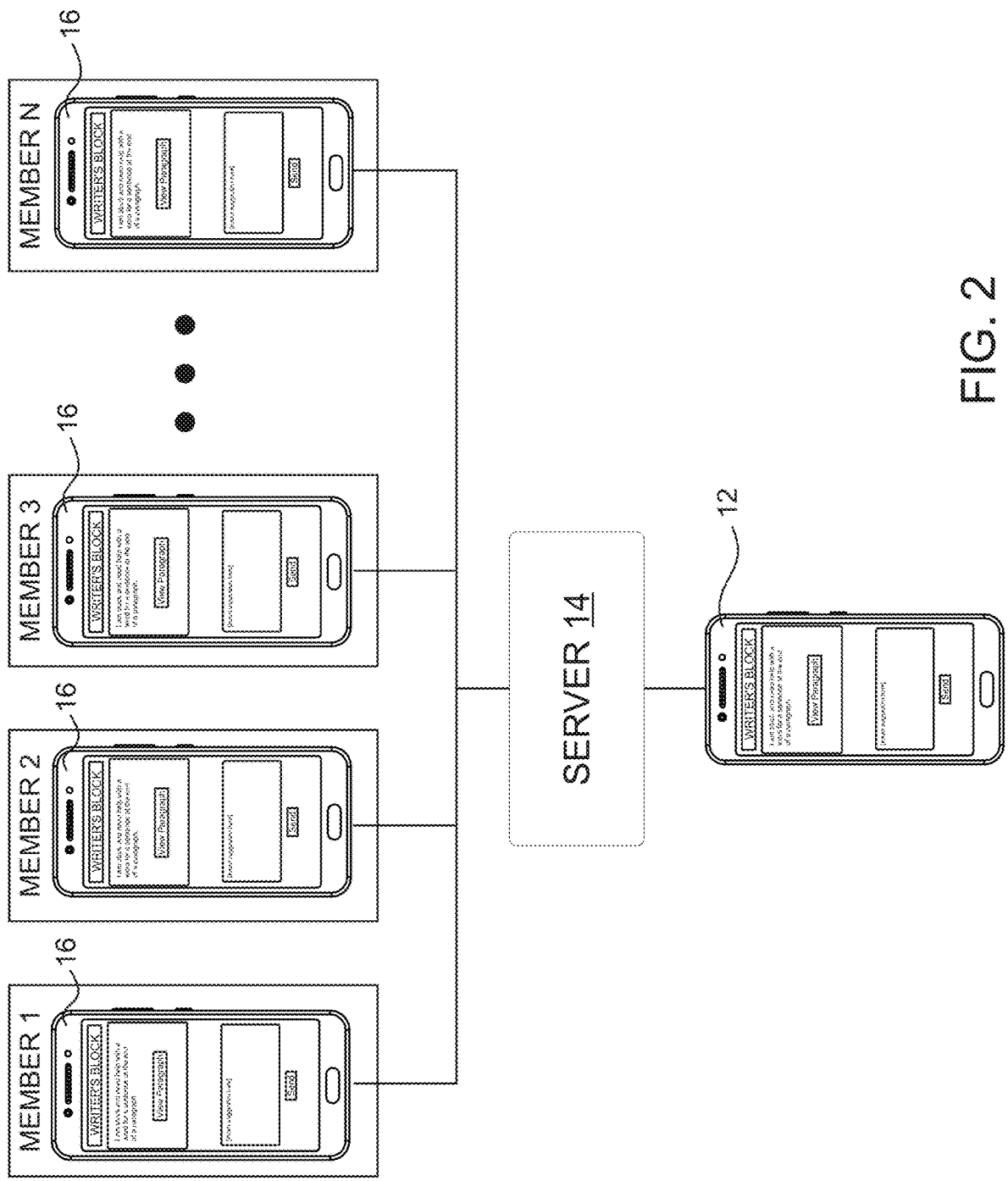
FIG. 2 depicts a creator computing device operating a creative work contribution system to request contributions from a plurality of contributors according to an embodiment.

FIGS. 1-2 depicts an embodiment of a creative work contribution system 10. The system 10 may include a creator computing device 12, contributor computing devices 16 and a server 14, wherein the creator computing device 12 and each contributor computing devices 16 are coupled to the computer server 14. This coupling may be a network connection, such as a wireless connection through an Internet connection, a 5G connection, a Wi-Fi connection, a Bluetooth connection or the like, wherein the creator computing device 12 and the contributor computing devices 16 may communicate with and receive communication from the server 14. The creator computing device 12 and each contributor computing devices 16 may include a desktop computer, a laptop, a tablet, a smartphone, wearable devices and the like. The server 14, in some embodiments, may be a computer server or a cloud-based infrastructure architecture.

The server 14 may include a memory storing various data. The memory of the server 14 may store user information, such as demographic information, and may further store creative work requests and contributions given and received relating to each creative work request and the demographic information of the contributor(s).

The creator computing device 12 and a plurality of contributor computing devices 16 may each be coupled to the server 14, and the server 14 may be programmed to a receive and store a creative work request from the creator computing device; automatically process the creative work request and send the creative work request to the plurality of contributor computing devices for display and for entering contributions to the creative work request; receive and store the contributions entered by the plurality of contributor computing devices; and automatically deliver the received contributions entered by the plurality of contributor computing devices for display on the creator computing device.

Referring to the drawings again, FIGS. 3A-8B depict various interfaces viewable with a contributor computing device 16 or a creator computing device 12 that may be available by an embodiment of the creative work contribution system 10.

Figure 3A:
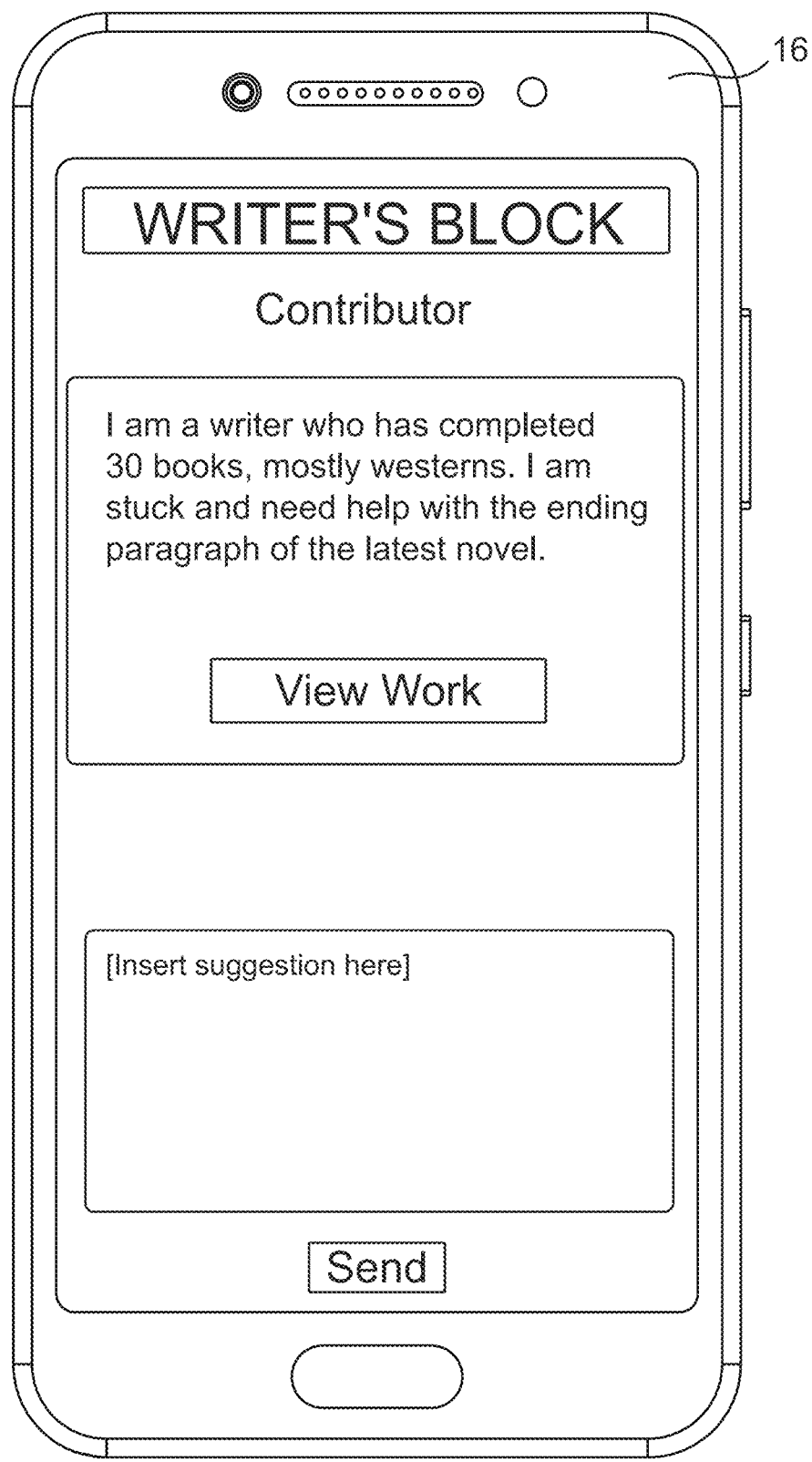
FIG. 3A depicts a contributor computing device operating as part of a creative work contribution system to contribute to a book according to an embodiment.
Figure 3B:
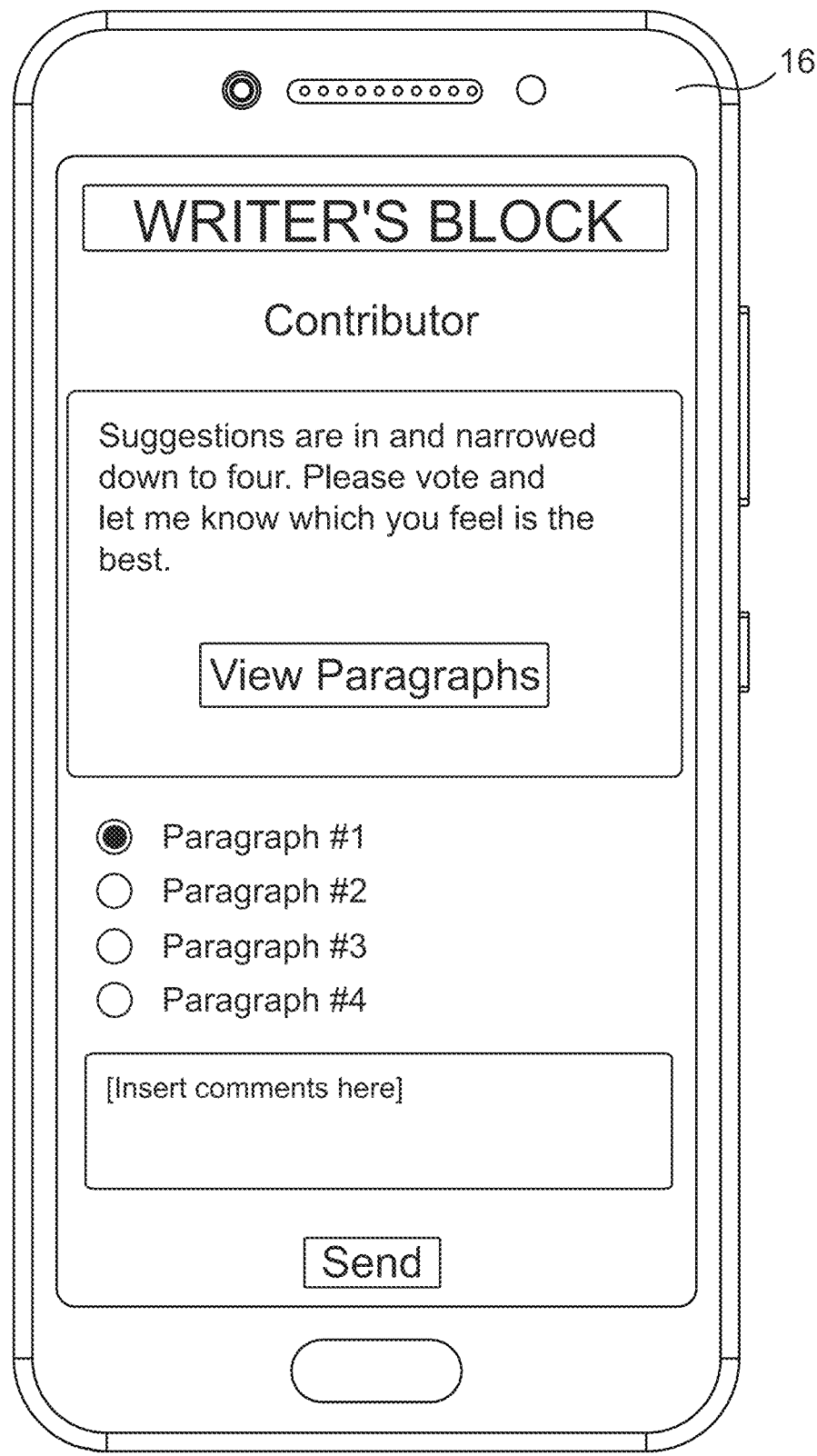
FIG. 3B depicts a contributor computing device operating as part of a creative work contribution system to vote on prior contributions to the book in FIG. 3A according to an embodiment.

FIG. 3A depicts a contributor computing device 16 requesting help with a book. The contributors may view the work and then enter a suggestion in the box indicated for doing so and send it to the server 14. The server may store and aggregate the contributions. Contributors who do not send in a suggestion may still contribute in another way as depicted in FIG. 3B, wherein the contributor computing device 16 may depict a voting interface for selecting a previously submitted contribution that the contributor likes in order to contribute to the creative work by confirming the prior contribution (such as selecting the contributors favorite a paragraph as depicted in FIG. 3B). These contributors may also comment if desired.

Figure 4A:
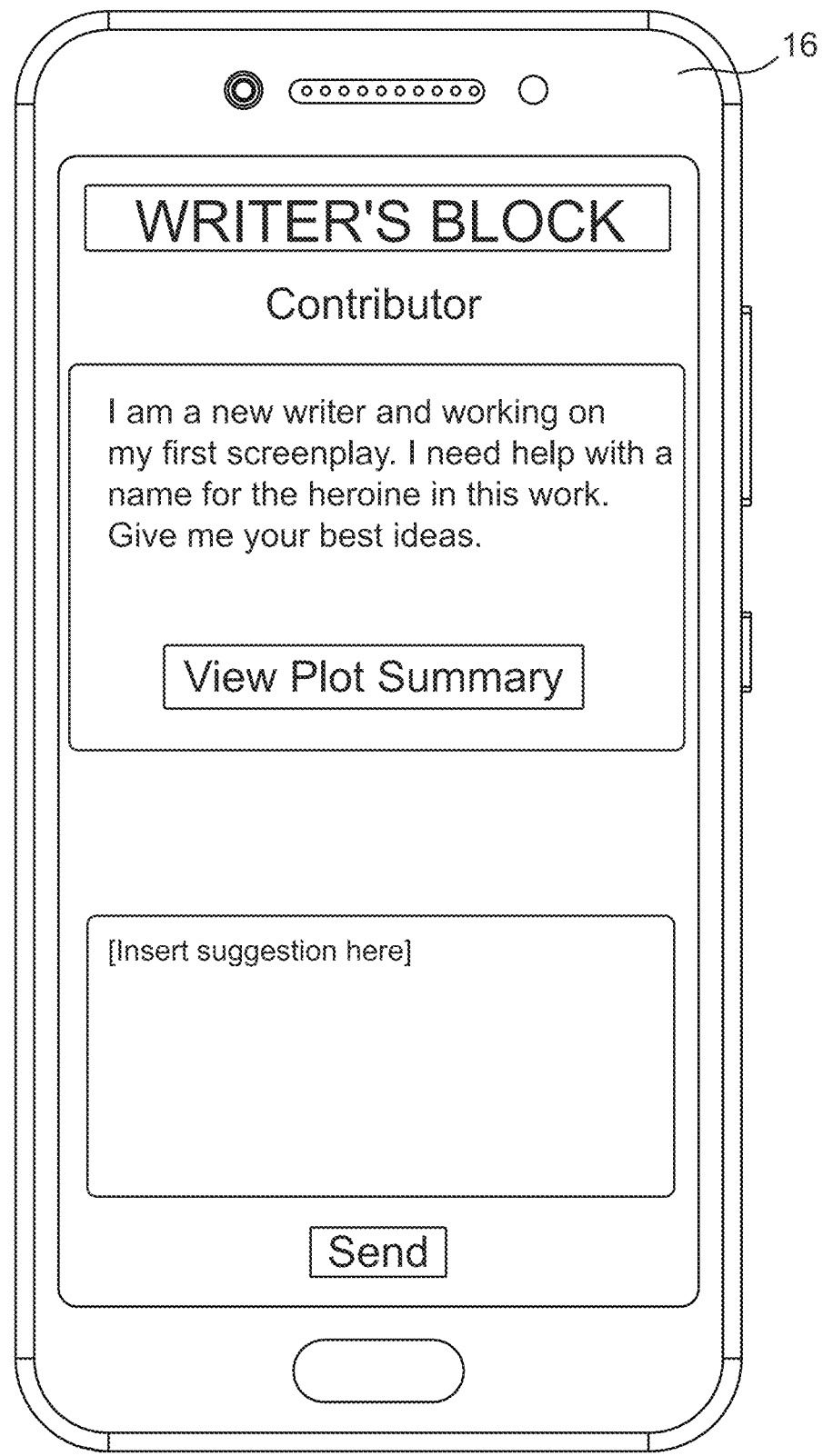
FIG. 4A depicts a contributor computing device operating as part of a creative work contribution system to contribute to a screenplay according to an embodiment.
Figure 4B:
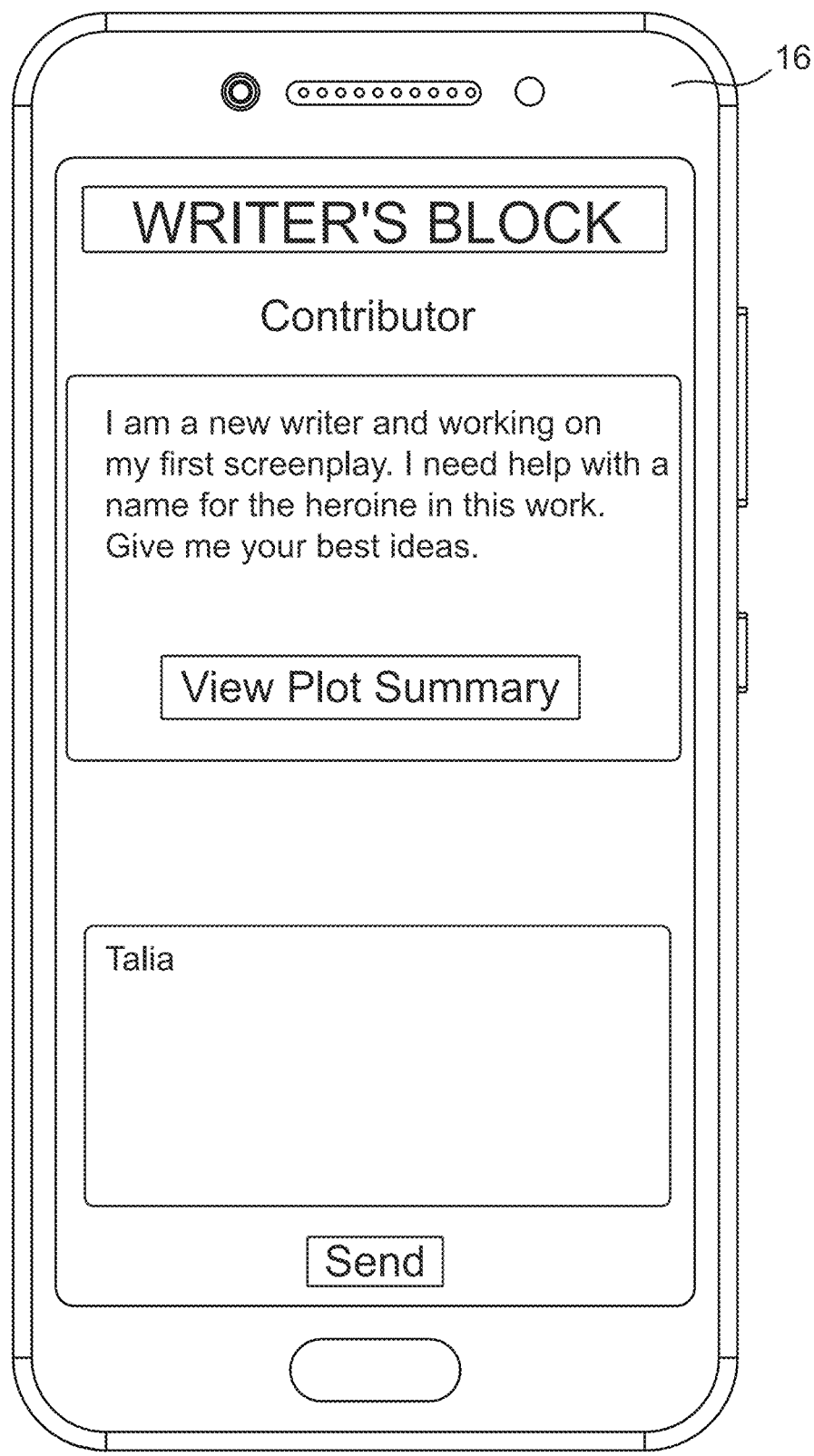
FIG. 4B depicts a contributor computing device operating as part of a creative work contribution system to contribute to the screenplay in FIG. 4A according to an embodiment.

FIG. 4A depicts a contributor computing device 16 requesting help with a screenplay. The contributors may view the plot summary or other portion of the work in order to contribute. As shown in FIG. 4B the contributor may enter a suggestion, such as the name inserted within the suggestion box in response to the creative work request and send it to the server. The server may store and aggregate the contributions for decisions to be made by the contributor when the creative work request is closed (no longer accepting contributions).

Figure 5A:
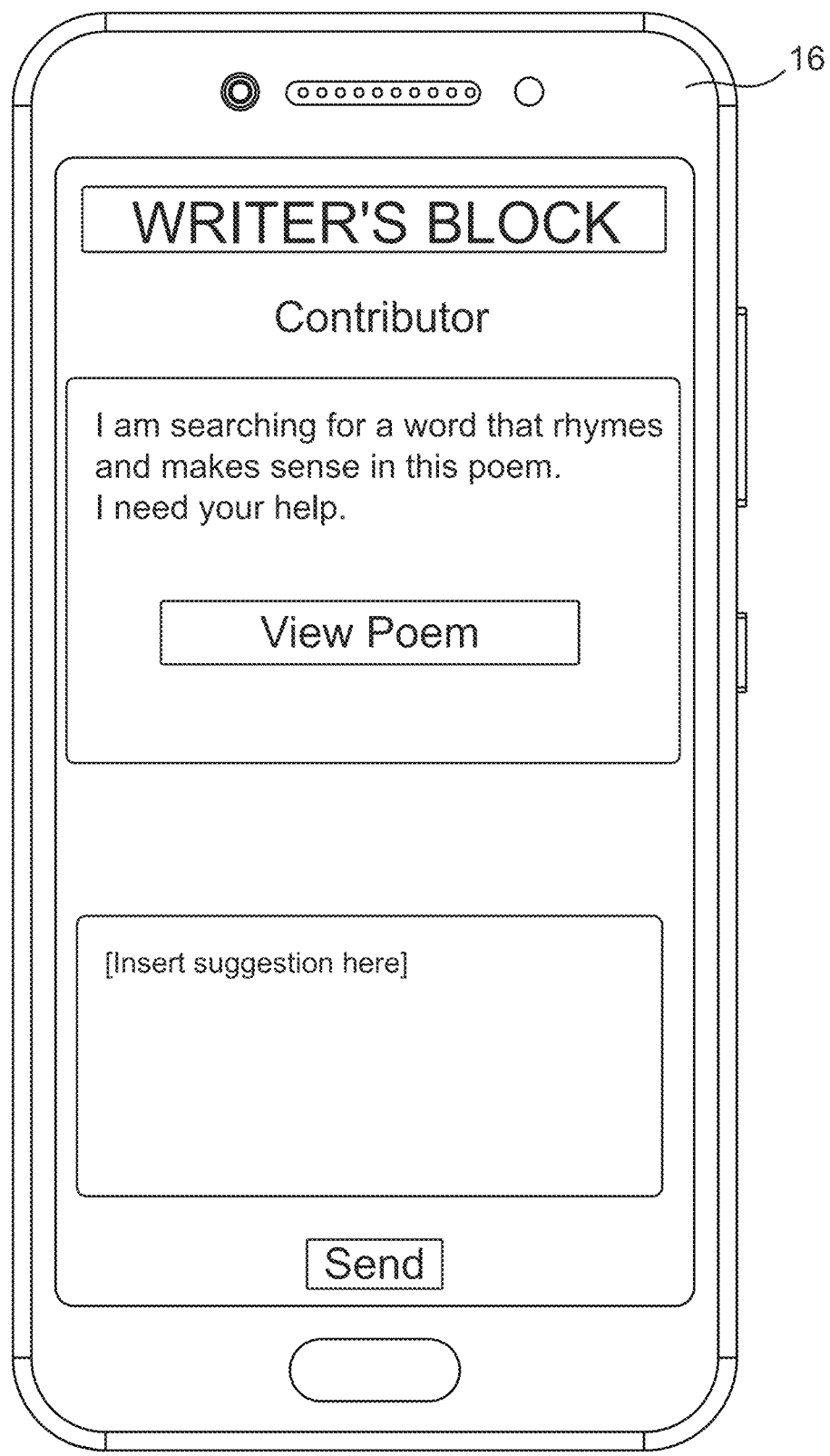
FIG. 5A depicts a contributor computing device operating as part of a creative work contribution system to contribute to a poem according to an embodiment.
Figure 5B:
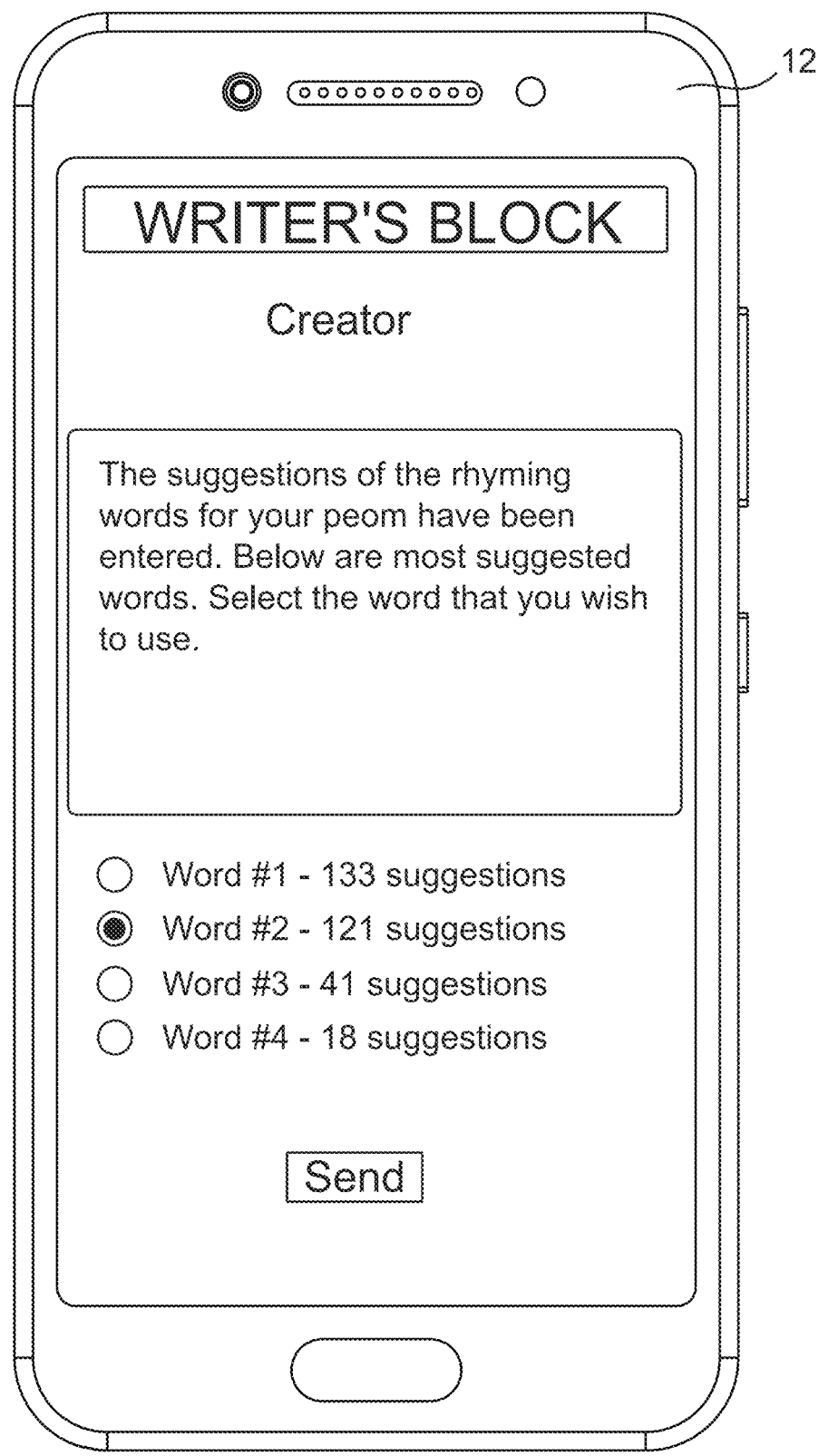
FIG. 5B depicts a creator computing device operating as part of a creative work contribution system to select one of multiple contributions to the poem in FIG. 5A according to an embodiment.

FIG. 5A depicts a contributor computing device 16 displaying a creative work request for help with a poem, such as but not limited to a rhyming word that makes sense within the poem. The contributors may suggest words using the suggestion box, similar to that described with regard to FIGS. 3A-4B. The server 14 may receive the suggestions and store and aggregate the suggestions associated with that particular creative work request. In embodiments, the creator device 12 may operate to show what words were suggested and the server may be programmed to list the words in a ranked list, such as most popular words as shown in FIG. 5B. The creator may then select the word the creator intends to use. This may be tracked so that the system knows the historical number of selected suggestions from each contributor over time. This information may be utilized for filtering purposes when using the system and further may be used to establish a ranking and/or reward points of the contributors based in part on the amount of suggestions that are actually selected for use by the creators. In some embodiments, all contributors to the creative work request may receive a notification showing the ranking of suggestions and the selected suggestion by the creator.

Figure 6A:
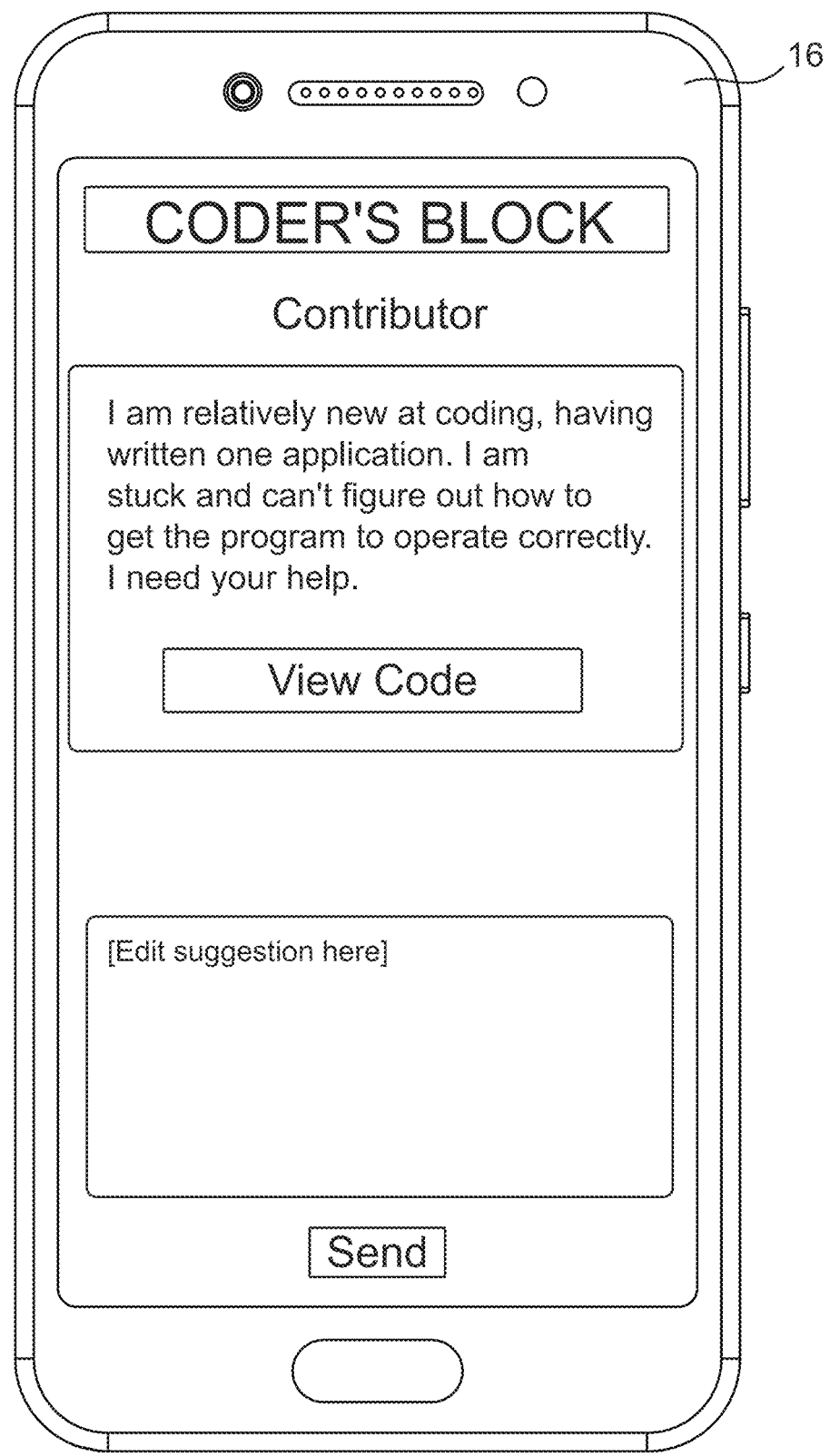
FIG. 6A depicts a contributor computing device operating as part of a creative work contribution system to contribute to code according to an embodiment.
Figure 6B:
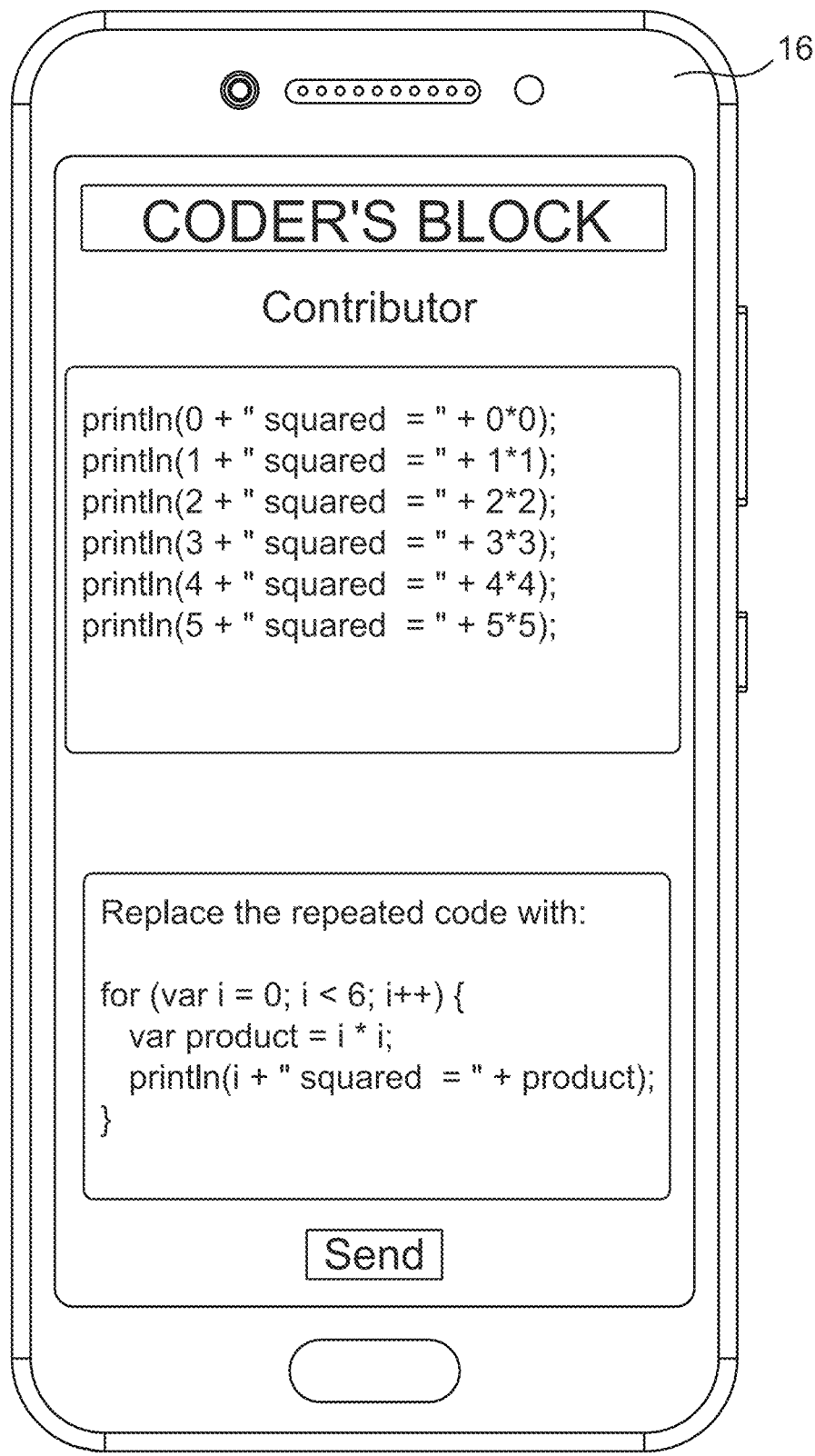
FIG. 6B depicts a contributor computing device operating as part of a creative work contribution system to contribute to the code in FIG. 6A according to an embodiment.

FIG. 6A depicts a contributor computing device 16 displaying a creative work request for assistance with a computer code. The contributor computing device 16 may include a View Code button in order to view the code from the creator. As depicted in FIG. 6B, the contributor computing device 16 includes an input box in order for the contributor to suggest changes to the code and send it to the server for storage and aggregation to correspond to the creative work request.

Figure 7A:
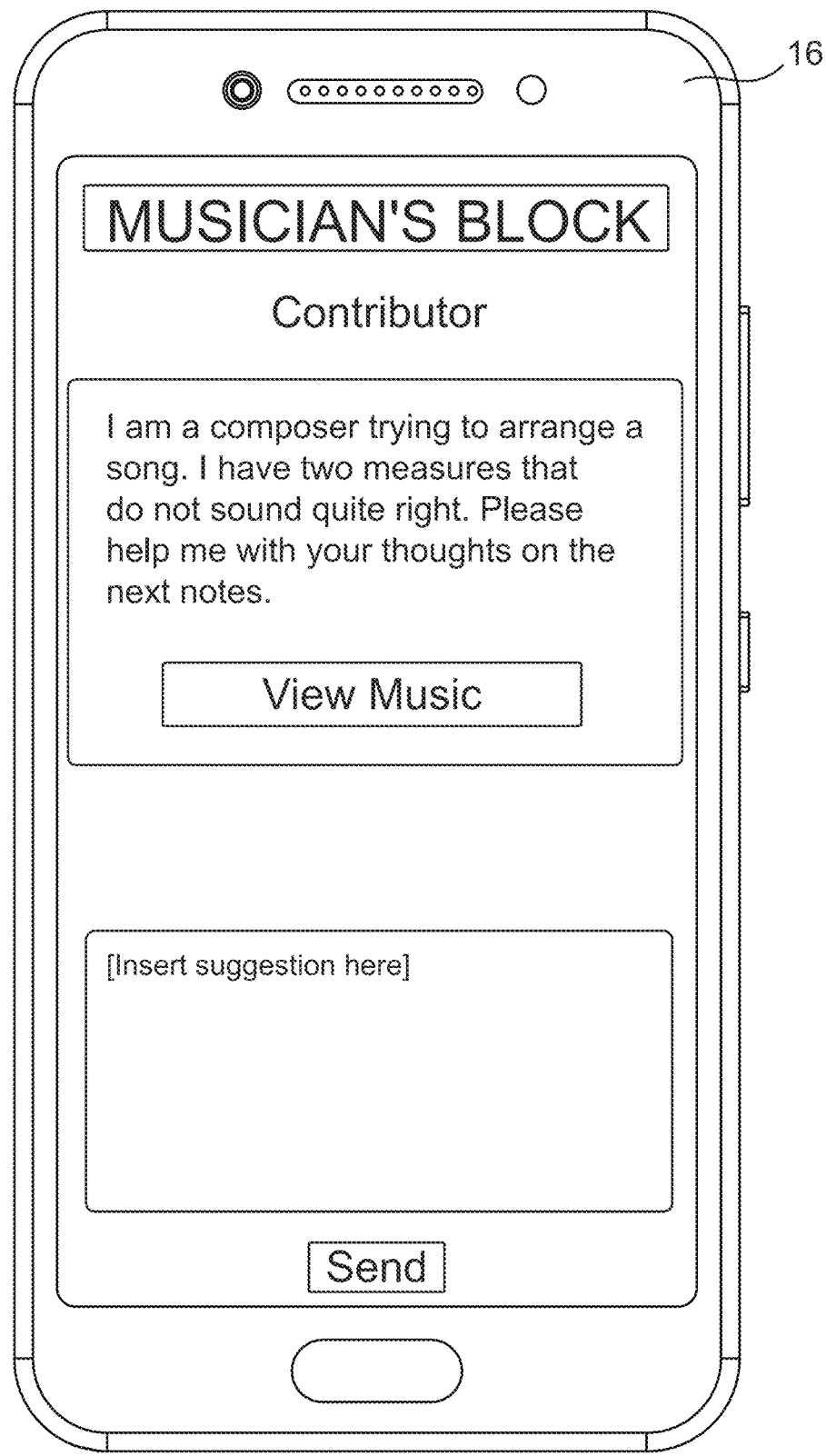
FIG. 7A depicts a contributor computing device operating as part of a creative work contribution system to contribute to a music composition according to an embodiment.
Figure 7B:
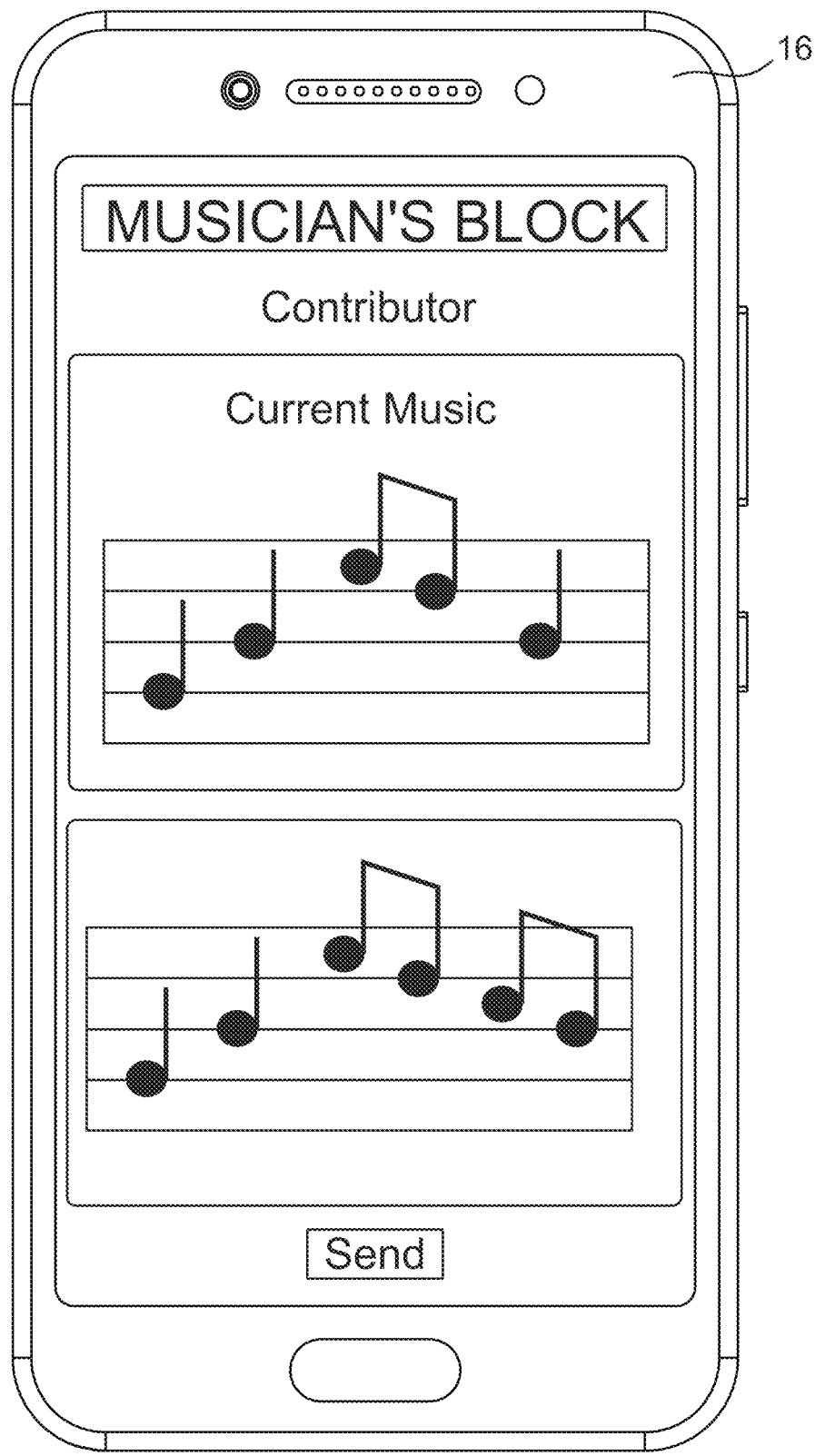
FIG. 7B depicts a contributor computing device operating as part of a creative work contribution system to contribute to the music composition in FIG. 7A according to an embodiment.

FIG. 7A depicts a contributor computing device 16 displaying a creative work request for assistance in a composing music. The contributor computing device may include a View Music button that can be selected to view the sheet music. The contributor may then enter suggested composed music notes as depicted in FIG. 7B and send it to the server for storage and aggregation.

Figure 8A:
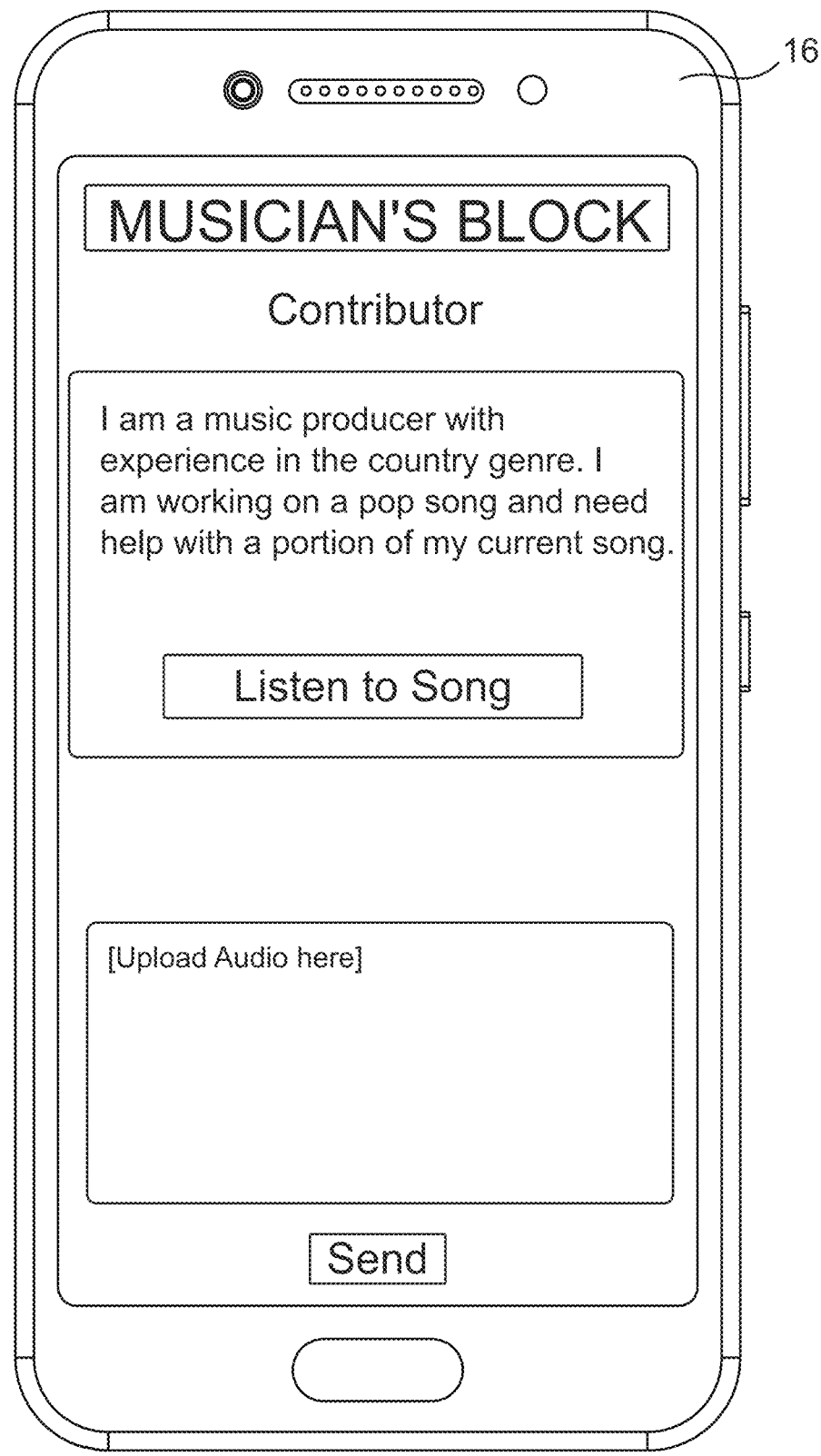
FIG. 8A depicts a contributor computing device operating as part of a creative work contribution system to contribute to recorded music according to an embodiment.
Figure 8B:
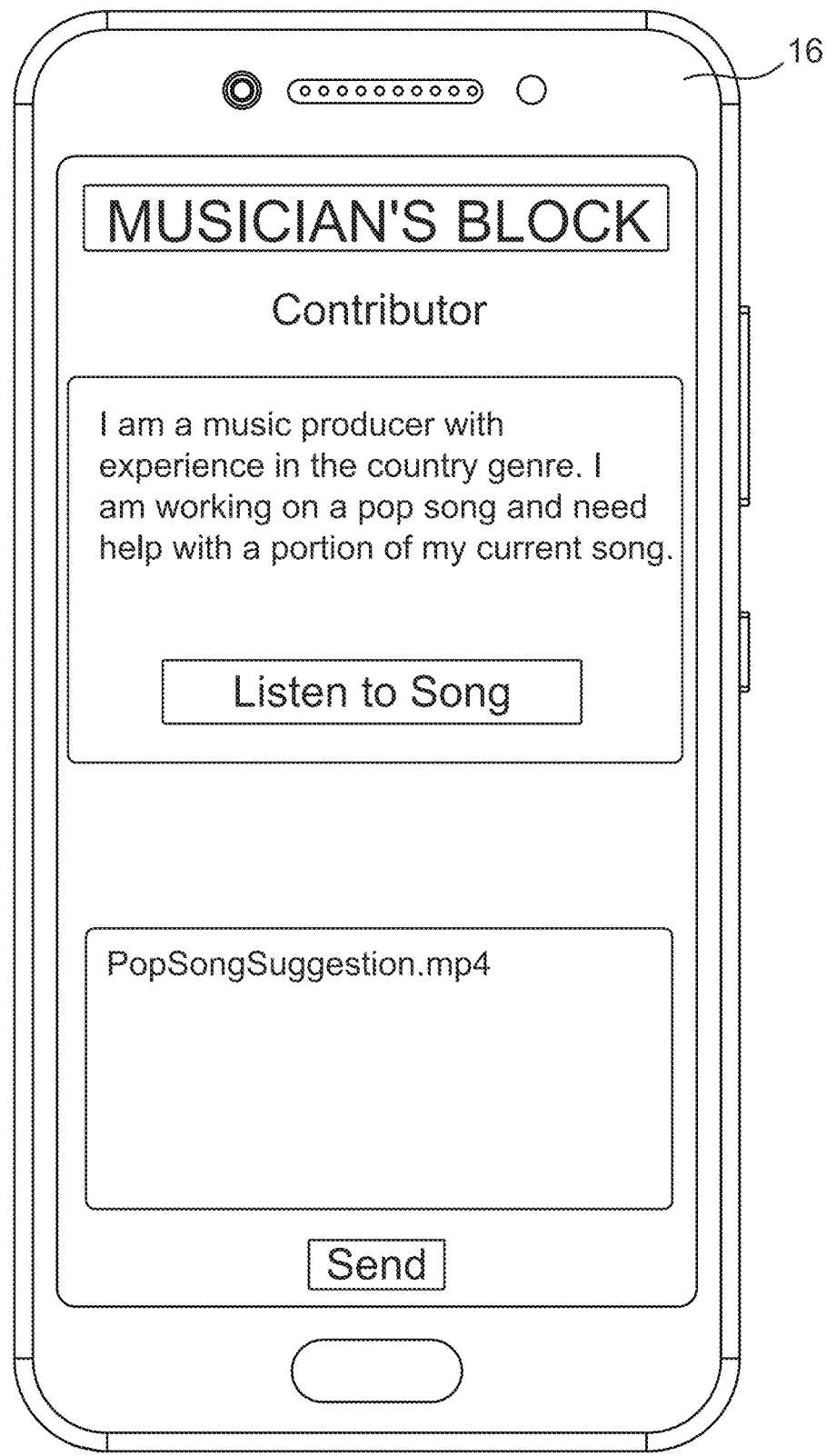
FIG. 8B depicts a contributor computing device operating as part of a creative work contribution system to contribute to the recorded music in FIG. 8B according to an embodiment.

FIG. 8A depicts a contributor computing device 16 displaying a creative work request for assistance in a produced music recording. The contributor computing device 16 may include a Listen to Song button that can be selected to listen to the song and then the contributor can insert a digital copy of a suggested music recording, including any comments corresponding to the suggested music recording and send it to the server 14 as shown in FIG. 8B. The server 14 may store and aggregate the submitted music recording corresponding to the creative work request.

Figure 9:
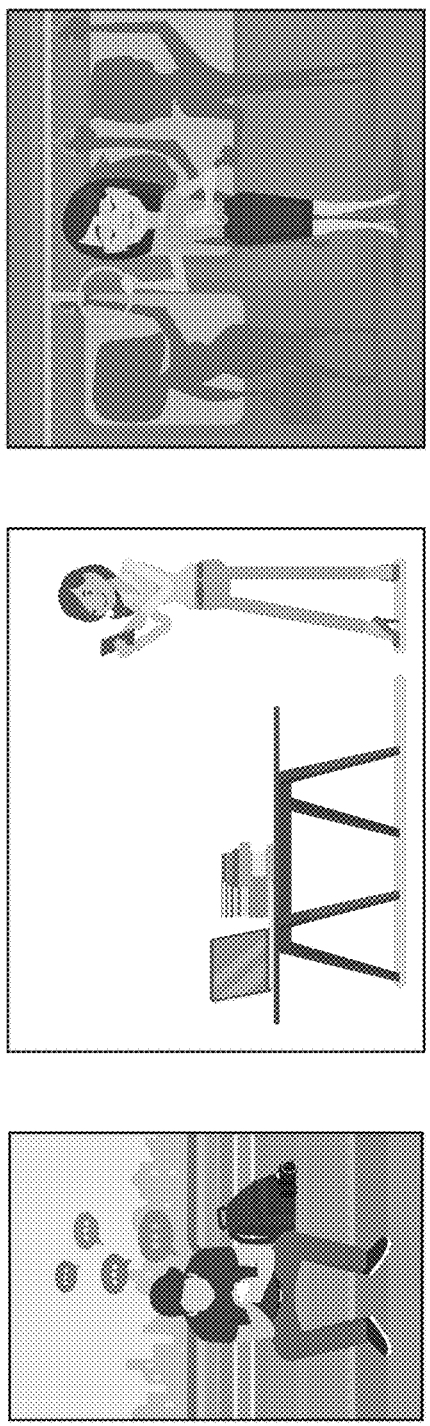
FIG. 9 depicts a view of various individuals contributing to creative works from various locations according to an embodiment.
Figure 9:
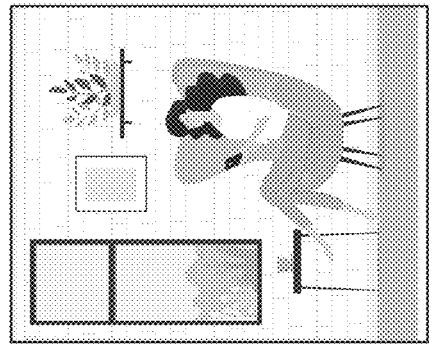
Figure 9:
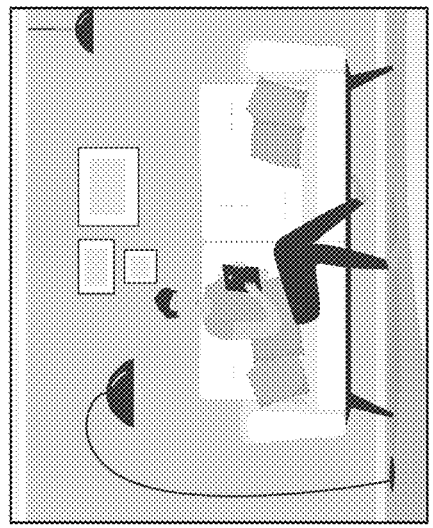
Figure 9:
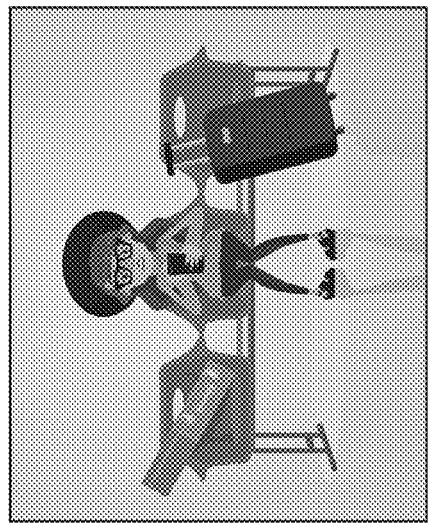
Figure 10:
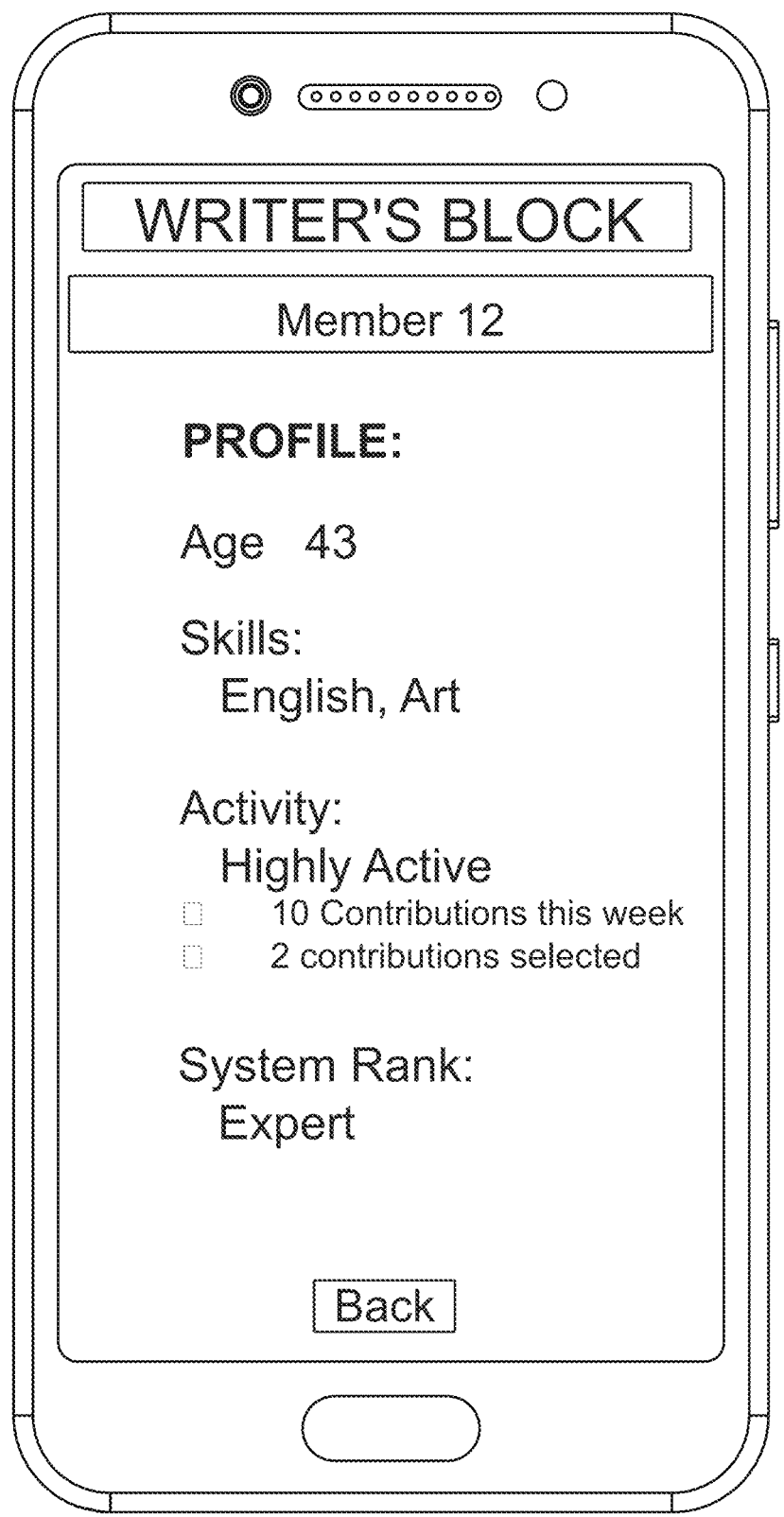
FIG. 10 depicts profile of a member of a creative work contribution system according to an embodiment.
Figure 11:
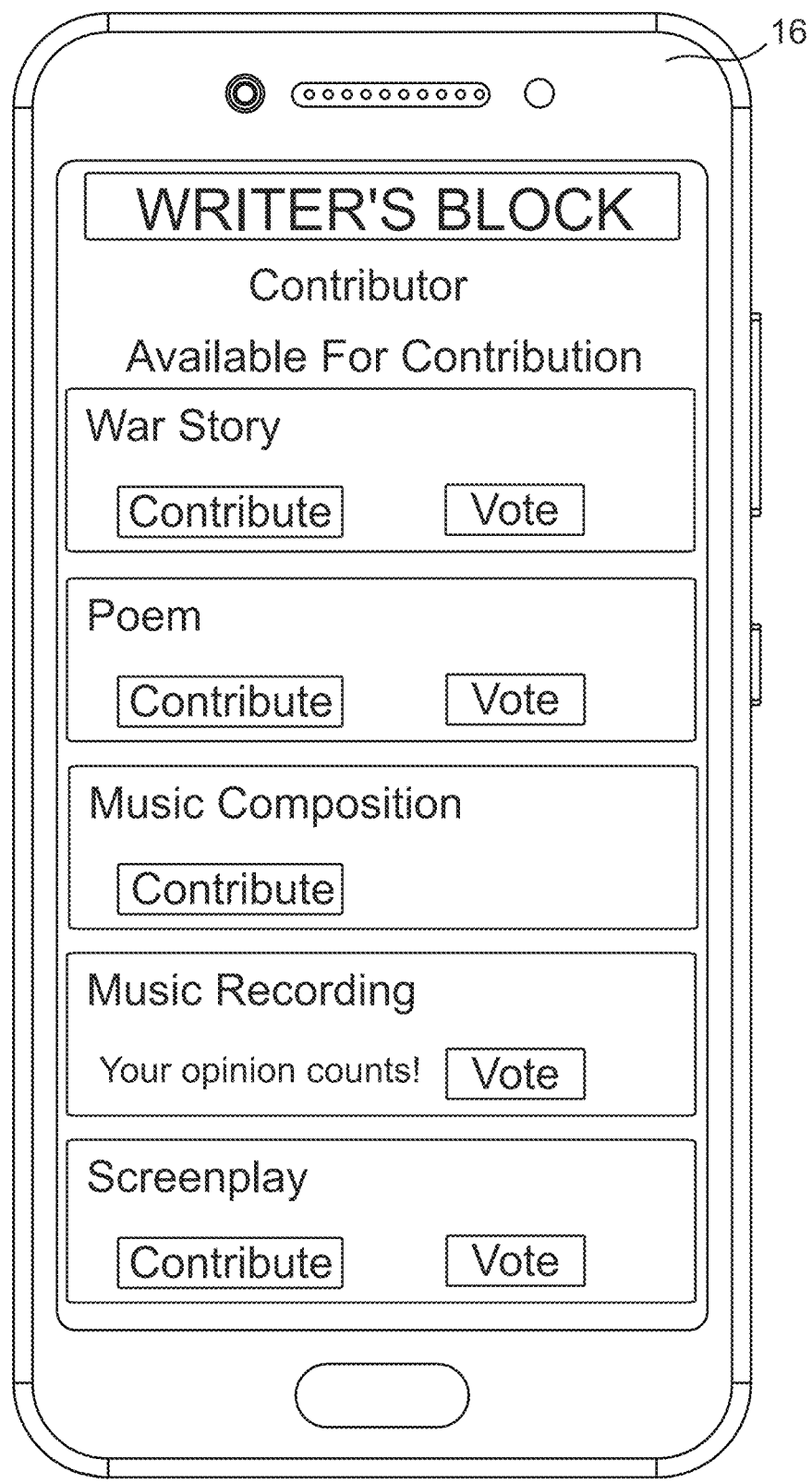
FIG. 11 depicts a contributor computing device depicting a list of possible creative work requests a contributor can contribute to according to an embodiment.

In utilizing the system, creators and contributors may engage the system 10 from anywhere at any time, as shown in FIG. 9. This allows contributors and creators to occupy their down time with creative work suggestions using the system 10. The system 10 operates to not only help creators, such as authors, coders, artists, musicians, composers and the like, it becomes an entertainment system for those who seek to contribute. It allows contributors to engage for as little or as much time as he or she desires. It can be a 30 second quick vote or it can be hours of contributing and voting. Additionally, creators or contributors may include profile information, such as age, skills, activity on the system 10, system rank and the like as depicted in FIG. 10. These profile entries may be utilized by a creator to filter the contributors who would receive a creative work request. A contributor may also browse the open creative work requests. In some embodiments, the contributor may view all open creative work requests, or the contributors may only view those open creative work requests that match certain criteria.

Figure 12:
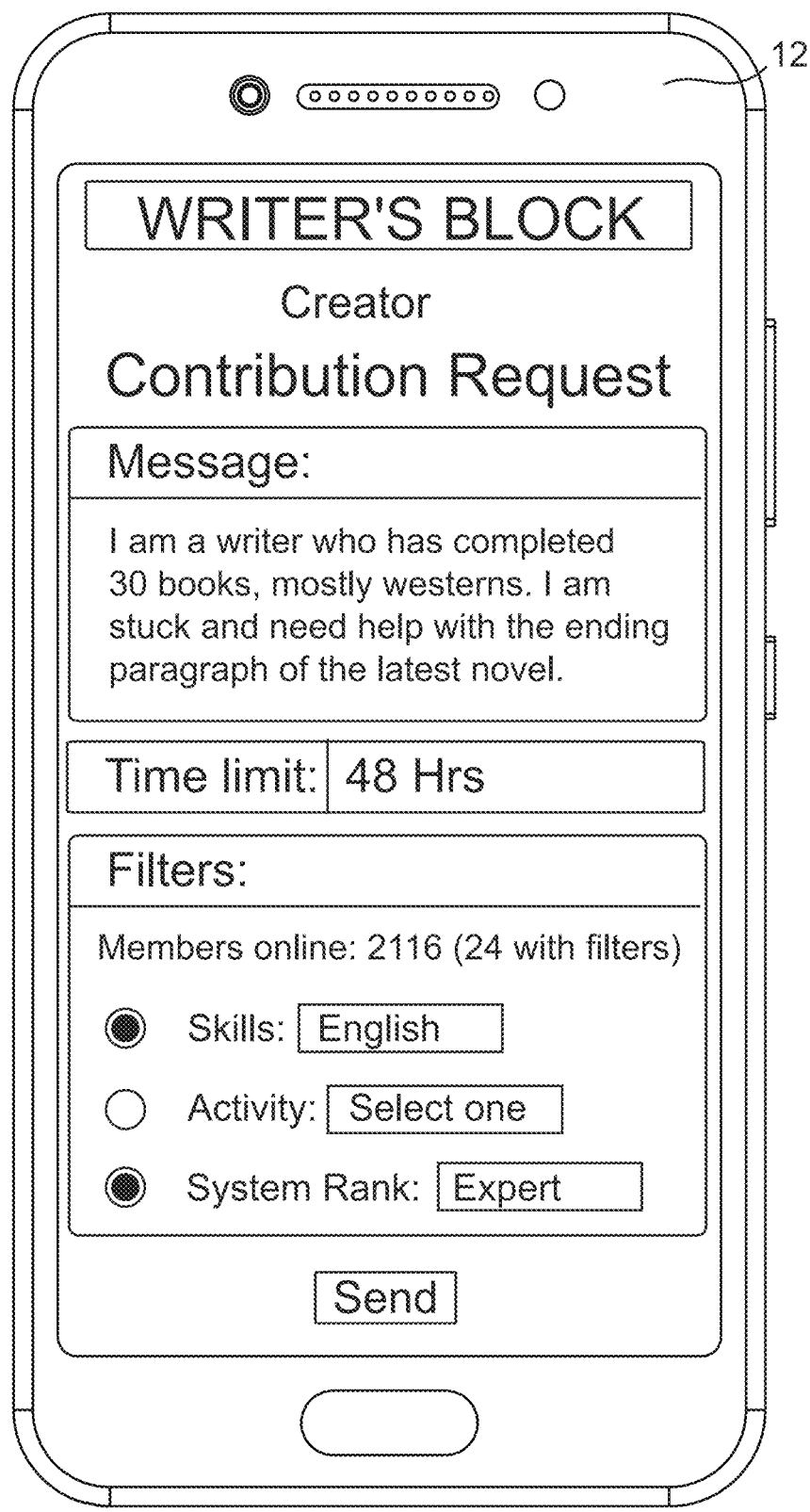
FIG. 12 depicts a creator computing device operating to send a creative work request to a server according to an embodiment.

Further, in operation, the creator may access the system 10 utilizing a creator computing device 12. As shown in FIG. 12, the creator may then upload a message and a portion of the creative work for display to contributors. The creator may then select features, such as the time limit for the creative work request to be open for contribution, filters including skills, activity on the system, system rank and the like. By selecting some filters, it can operate to reduce the number of contributors that are allowed to give suggestions using the system 10.

Figure 13:
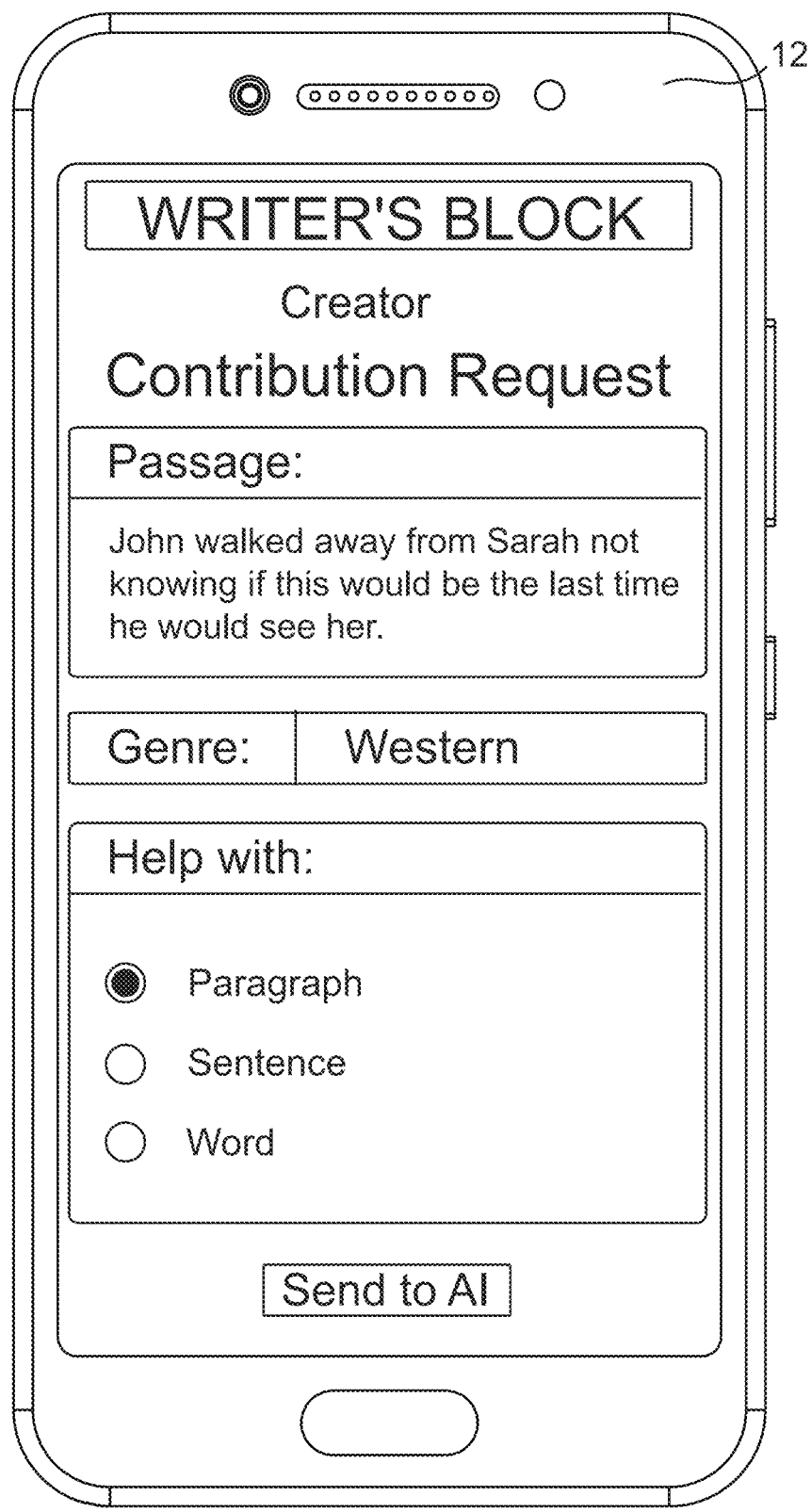
FIG. 13 depicts a creator computing device operating to send a creative work request to a server according to an embodiment.

Another embodiment is provided in FIG. 13. In operation of this embodiment, the creator may access the system 10 utilizing a creator computing device 12. As shown in FIG. 13, the creator may then upload a portion of the creative work for which the creator wishes to receive assistance in completing. The creator may then select send for artificial intelligent suggestion, such as selecting "Send" button 20. By selecting the "Send" button 20, the passage and request may be sent to the server 14 operating an artificial intelligence software program ("AI software"). The AI software operates to analyze the portion of the creative work sent by the creator. The AI software may then generate a suggestion send the same for display on the creator computing device. It will be understood that the AI software operates to analyze the passage of creative work submitted. In some embodiment, the AI software may require a larger portion of the creative work in order to analyze and prepare a suggestion. The AI software may include programming for determining style and tone of the creator and then present a suggestion within the same style and tone. In other embodiments, the AI software may only need a small portion or even just a topic in order to prepare a suggestion. Additionally, the AI may be adapted for use with written works, artistic works, computer code, music and the like.

The system 10 may operate with an option for voting or polling. Creators may request opinions of other creators and contributors of the system 10. It allows for these other creators and contributors to vote on a creative work and provide an opinion, such as like or dislike and to also optionally comment. Because of how the system stores and aggregates data submitted by contributors, the creator requesting the polling can then sort based on certain demographic or user profile information, for example based on skill, rating level, activity level and the like. Further, embodiments may include weighing votes of certain voters greater than others based on the user profile information and how it corresponds to the creative work being voted on.

Embodiments may be available on or through the internet, such as through domain names reserved and owned by Applicant that include coders-block.com, missing-note.com, final-stroke.com, artistsbestfriend.com, and opinion-finder.com.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire-line, optical fiber cable, RF, etc., or any suitable combination of the foregoing.

Computer program code for carrying out operations for aspects of the present invention may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, cloud-based infrastructure architecture, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The embodiments and examples set forth herein were presented in order to best explain the present invention and its practical application and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above without departing from the spirit and scope of the forthcoming claims.

The invention claimed is:

1. A creative work contribution system comprising:
a server having a memory storing user information comprising contributor profile information; and
a creator computing device of a creator and a plurality of contributor computing devices of contributors coupled to the server, wherein the server is programmed to:
receive and store a creative work request from the creator computing device;
automatically process the creative work request and send the creative work request to a first portion of the plurality of contributor computing devices for display and for entering contributions to the creative work request, wherein the contributor profile information is utilized by the creator to filter the plurality of contributor computing devices that receive the creative work request, and wherein the plurality of contributor computing devices comprise an input box for entering contributions;
receive and store the contributions entered by the first portion of the plurality of contributor computing devices;
automatically deliver the received contributions entered by the plurality of contributor computing devices for display on the creator computing device;
receive and store an opinion request from the creator computing device, wherein the opinion request comprises voting or polling by a second portion of the plurality of contributor computing devices, wherein the first portion of the plurality of user computing devices is different from the second portion of the plurality of contributor computing devices;
receive and store the votes or poll responses entered by the second portion of the plurality of contributor computing devices in response to the opinion request; and
weigh votes or poll responses of certain contributors greater than others based on the user profile information of the contributors and how the user profile corresponds to the creative work being voted on.

2. The creative work contribution system of claim 1, wherein the creator computing device is a mobile computing device.

3. The creative work contribution system of claim 2, wherein a mobile application operates on the creator computing device.

4. The creative work contribution system of claim 1, wherein the plurality of contributor computing devices are mobile computing devices.

5. The creative work contribution system of claim 4, wherein a mobile application operates on the plurality of contributor computing devices.

6. The creative work contribution system of claim 5, wherein the mobile application operating on the plurality of contributor computing devices provides a contributor user interface for the contributors to view a creative work and enter a suggestion.

7. The creative work contribution system of claim 1, wherein the contributors may browse the creative work requests that are open.

8. The creative work contribution system of claim 1, wherein the user information comprises demographic information of the creator and demographic information of the contributors.

9. The creative work collaboration system of claim 1, wherein the user information comprises profile information.

10. The creative work collaboration system of claim 9, wherein the creator and contributors profile information comprises skill level, rating level and/or activity level of the creator and the contributors.

11. The creative work collaboration system of claim 1, wherein the creator and each of the contributors are located at different locations.

12. The creative work contribution system of claim 1, wherein the creative work request comprises a time limit for the creative work request to be open for the contributions.

13. The creative work contribution system of claim 1, wherein the server aggregates the stored contributions for decisions to be made when the creative work request is closed and no longer accepting contributions.

14. The creative work contribution system of claim 1, wherein the creator computing device sorts the votes or poll responses based on the user profile information of the contributors.

\* \* \* \* \*